US012484487B2

(12) United States Patent
Wu et al.

(10) Patent No.: US 12,484,487 B2
(45) Date of Patent: Dec. 2, 2025

(54) FLOWERPOT STRUCTURE

(71) Applicant: Taizhou PuShangQu Gardening Products Co., Ltd., Taizhou (CN)

(72) Inventors: Jing Wu, Taizhou (CN); YuXuan Wu, Taizhou (CN); Huanchao Chen, Taizhou (CN)

( * ) Notice: Subject to any disclaimer, the term of this patent is extended or adjusted under 35 U.S.C. 154(b) by 0 days.

(21) Appl. No.: 18/738,011

(22) Filed: Jun. 9, 2024

(65) Prior Publication Data
US 2024/0324517 A1     Oct. 3, 2024

(30) Foreign Application Priority Data

Mar. 7, 2024   (CN) .......................... 202420442755.6
Apr. 30, 2024  (CN) .......................... 202420925893.X

(51) Int. Cl.
*A01G 9/02*     (2018.01)
*A01G 9/04*     (2006.01)

(52) U.S. Cl.
CPC ............... *A01G 9/02* (2013.01); *A01G 9/042* (2013.01); *A01G 9/0302* (2025.01)

(58) Field of Classification Search
CPC .......... A01G 9/02; A01G 9/021; A01G 9/026; A47G 7/085; B65D 15/00; B65D 25/20
See application file for complete search history.

(56) References Cited

U.S. PATENT DOCUMENTS

| | | | | |
|---|---|---|---|---|
| 5,195,271 A | * | 3/1993 | Bradley, Jr. ............ | A47G 7/085 47/72 |
| 10,375,899 B2 | * | 8/2019 | Munt, III ............... | A01G 9/026 |
| 10,408,522 B2 | * | 9/2019 | Tsui ..................... | B65D 21/086 |
| 2006/0207175 A1 | | 9/2006 | Wu | |
| 2008/0289253 A1 | * | 11/2008 | Rubin .................... | A47G 7/085 47/72 |
| 2013/0000196 A1 | * | 1/2013 | Weder .................... | A01G 9/026 47/66.3 |
| 2013/0014438 A1 | | 1/2013 | Teng | |
| 2019/0307076 A1 | * | 10/2019 | Smith .................... | A01G 9/026 |
| 2020/0352107 A1 | | 11/2020 | Kim et al. | |
| 2022/0174887 A1 | * | 6/2022 | Ager ...................... | A01H 1/02 |

FOREIGN PATENT DOCUMENTS

| | | | | |
|---|---|---|---|---|
| CN | 113692881 A | * | 11/2021 | .......... A01G 27/005 |
| KR | 20120121047 A | * | 11/2012 | .......... A01G 9/021 |
| NL | 2028417 B1 | * | 12/2022 | .......... A01G 9/021 |

* cited by examiner

*Primary Examiner* — Joshua D Huson
*Assistant Examiner* — Katherine Anne Kloecker

(57) ABSTRACT

The present disclosure relates to a flowerpot structure, including a flowerpot body. The flowerpot body includes an inner pot and an outer pot that are detachably matched, the inner pot includes a pot opening and a compressible pot body, an upper end of the outer pot is detachably matched with the pot opening, the outer pot is detachably mounted with a pot holder, and the outer pot can be unfolded into a sheet-like structure. The flowerpot of the present disclosure achieves a reduction in transportation volume by using its detachable structure. No matter whether a single flowerpot is or a plurality of flowerpots are transported, the packaging volume during transportation can be reduced by disassembly and compression.

9 Claims, 21 Drawing Sheets

FLOWERPOT STRUCTURE

TECHNICAL FIELD

The present disclosure relates to the technical field of flowerpot manufacturing, and specifically to a flowerpot structure.

DESCRIPTION OF RELATED ART

As a type of vessels for planting, flowerpots are often seen or used in daily life. Conventional flowerpots are mostly one-piece structures. In order to save space during transportation, most flowerpots are designed as a conical structure reduced from top to bottom. In this way, several flowerpots can be stacked together during transportation to greatly reduce transportation space. With the rise of on-line shopping, on-line sales have become the main sales channel for many merchants. Sometimes individuals buy few, and even only one flowerpot at a time, and in this case, the existing one-piece flowerpots have a large packaging volume and lead to high transportation costs. Therefore, the structures of the existing flowerpots need to be further improved.

SUMMARY OF PRESENT INVENTION

In view of this, the present disclosure aims to disclose a flowerpot structure that has a reasonable structure and can greatly save space during transportation.

The technical solution of the present disclosure is implemented as follows:

A flowerpot structure, including a flowerpot body, where the flowerpot body includes an inner pot and an outer pot that are detachably matched, the inner pot includes a pot opening and a compressible pot body, an upper end of the outer pot is detachably matched with the pot opening, the outer pot is detachably mounted with a pot holder, and the outer pot can be unfolded into a sheet-like structure.

Measures to further optimize the technical solution are as follows:

As an improvement, the pot opening and the pot body are fixed into a one-piece structure, and the pot body is made of a flexible material.

As an improvement, the pot opening and the pot body are fixed into a one-piece structure, and the pot body is composed of a plurality of pot rings capable of being vertically and movably compressed.

As an improvement, the outer pot is of a cylindrical structure formed by connecting a head and a tail of a single material piece or a cylindrical structure formed by splicing a plurality of material pieces, the upper end and a lower end of the outer pot are provided with buckle slots respectively, the pot opening and the pot holder are provided with buckles adapted to the buckle slots respectively, and a side edge of the outer pot is provided with connecting buckles.

As an improvement, the flowerpot body is provided with a decorative light strip, and the outer pot employs a hollow structure or is made of a light transmitting material. Irradiation of light produced by the decorative light strip mounted on the flowerpot body can increase the aesthetics of the flowerpot.

As an improvement, the decorative light strip is connected to an electric wire, the pot holder is provided with a threading hole, and an edge of the pot holder is provided with a wiring duct. The threading hole and the wiring duct facilitate the routing of the electric wire.

As an improvement, the outer pot includes a plate main body, the plate main body is of a continuous bending structure, upper and lower ends of the plate main body are provided with a shaping groove rail, a guide rod is detachably matched in the shaping groove rail, and the guide rod is inserted at an end of the plate main body.

Compared with the prior art, the advantages of the present disclosure are as follows:

The flowerpot structure of the present disclosure is reasonable, where the inner pot and the outer pot are detachably matched, the pot body in the inner pot is of a compressible structure, and the outer pot can be unfolded into a sheet-like structure. During transportation, the pot body is compressed to reduce the packaging volume, and the outer pot is unfolded into the sheet-like structure to further reduce the packaging volume, thereby greatly reducing transportation costs. The flowerpot of the present disclosure achieves a reduction in transportation volume by using its detachable structure. No matter whether a single flowerpot is or a plurality of flowerpots are transported, the packaging volume during transportation can be reduced by disassembly and compression.

Figure 1:
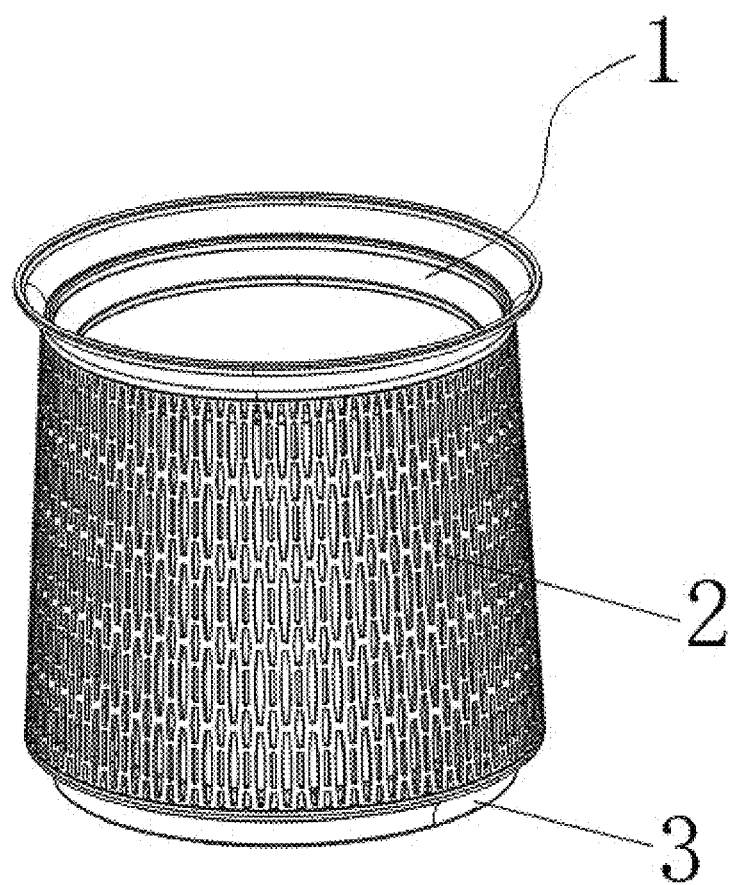
FIG. 1 is a perspective view of Embodiment 1 of the present disclosure.
Figure 2:
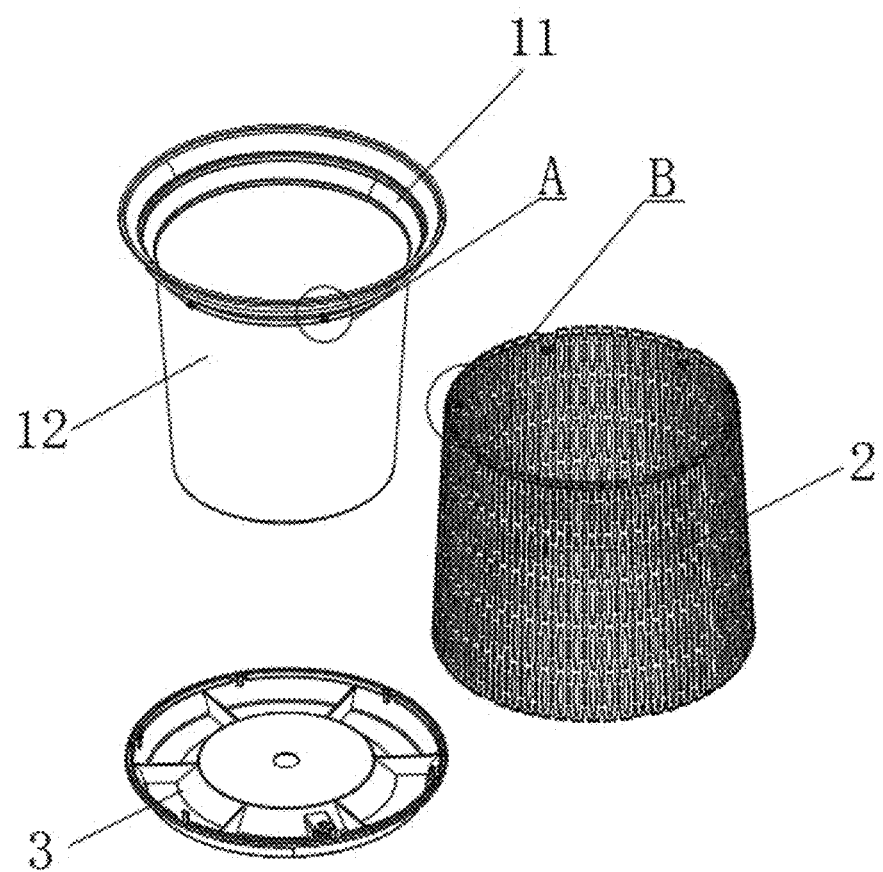
FIG. 2 is an exploded view of Embodiment 1 of the present disclosure.
Figure 3:
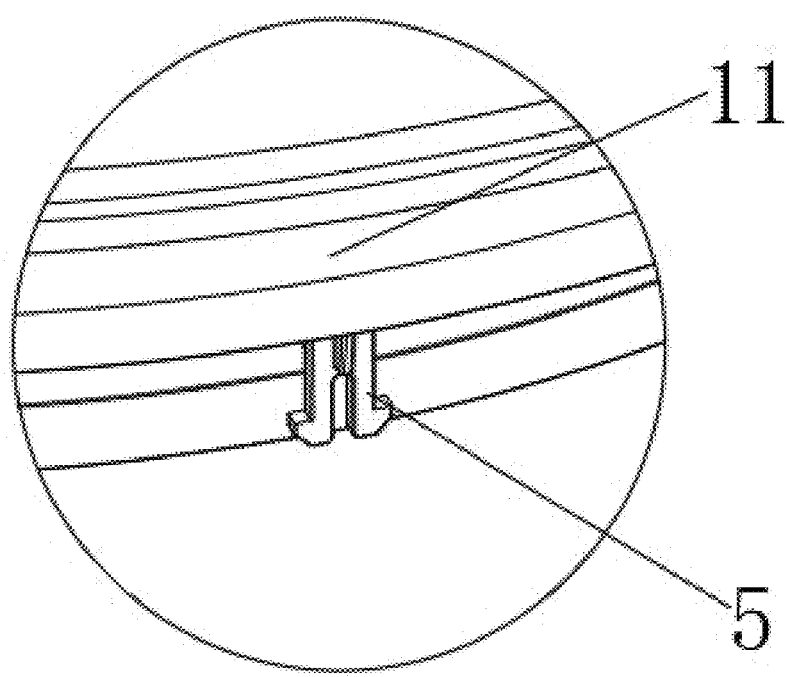
FIG. 3 is an enlarged view of part A in FIG. 2.
Figure 4:
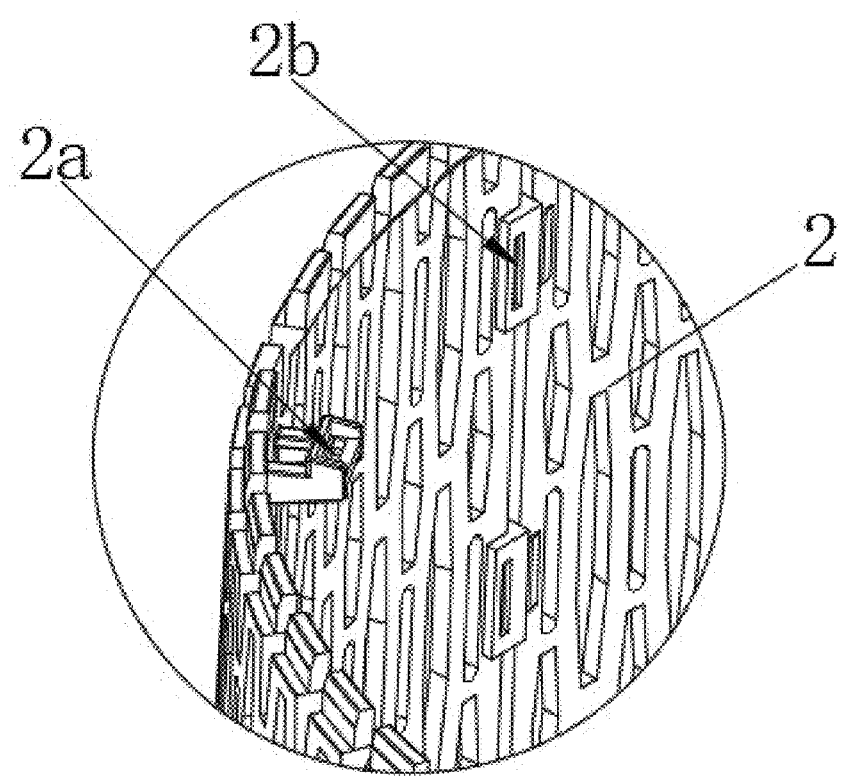
FIG. 4 is an enlarged view of part B in FIG. 2.
Figure 5:
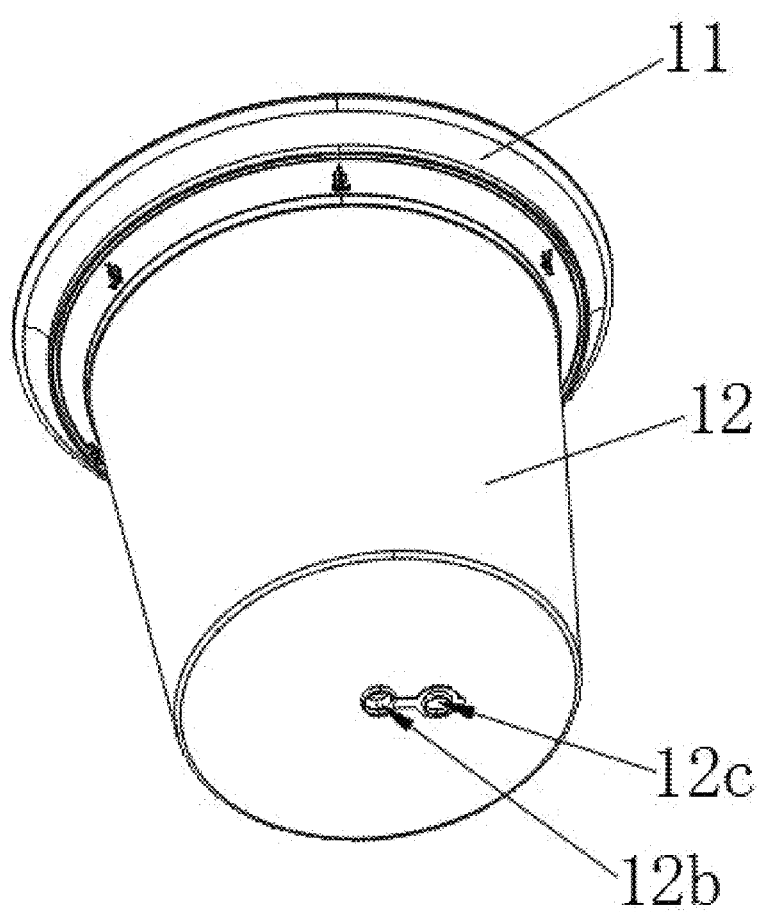
FIG. 5 is a perspective view of an inner pot in FIG. 2.
Figure 6:
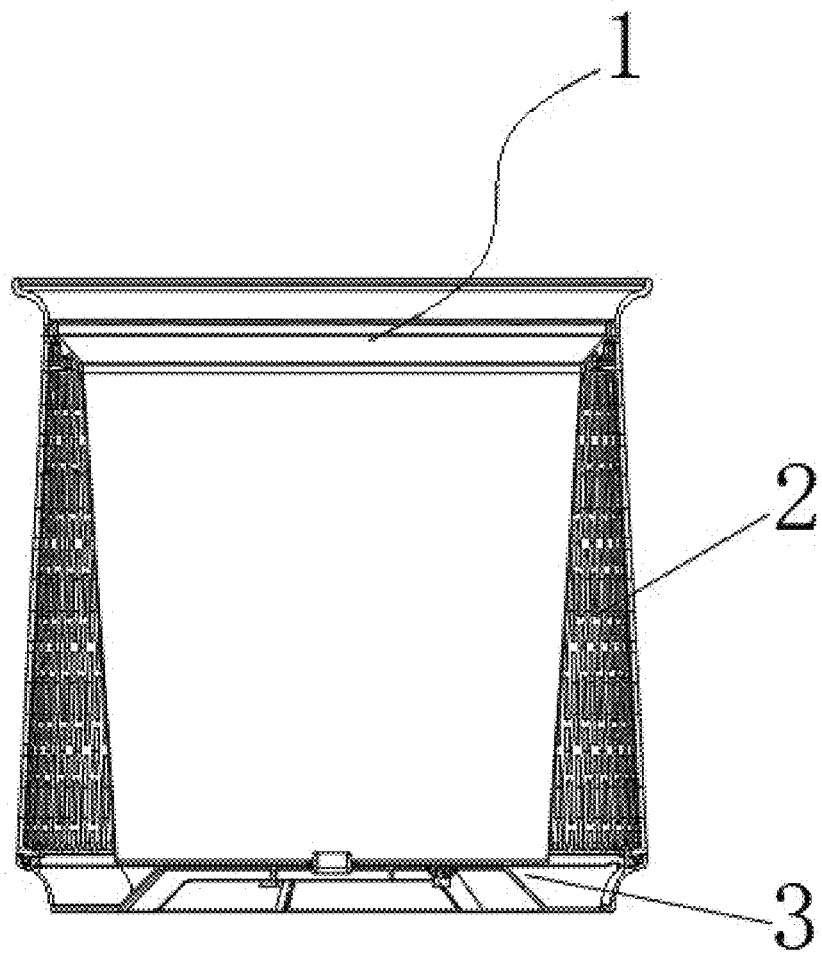
FIG. 6 is a cross-sectional view of Embodiment 1 of the present disclosure.

Names of reference numerals in the accompanying drawings of the present disclosure are as follows:

Inner pot 1, pot opening 11, recess 11b, pot body 12, pot ring 12a, drainage hole 12b, plug cover 12c, outer pot 2, buckle slot 2a, connecting buckle 2b, plate main body 21, bending groove 21a, shaping groove rail 22, guide rod 23, buckle 24, limit ring 25, pot holder 3, threading hole 3a, wiring duct 3b, upper connecting ring 41, lower connecting ring 42, vertical rod 43, inner bending hinge 44, buckle 5, and decorative light 6.

DESCRIPTION OF THE EMBODIMENTS

The present disclosure will be further described in detail below in conjunction with the accompanying drawings:

The following description is used for disclosing the present disclosure to enable those skilled in the art to practice the disclosure. Preferred embodiments in the following description are for examples only, and those skilled in the art can conceive other obvious variations. The basic principles of the present disclosure defined in the following description can be applied to other embodiments, variations, improvements, equivalents, and other technical solutions that do not deviate from the spirit and scope of the present disclosure.

Those skilled in the art should understand that, in the description of the present disclosure, the orientations or positions indicated by the terms "longitudinal", "lateral", "upper", "lower", "left", "right", "front", "rear", "vertical", "horizontal", "top", "bottom", "inner", "outer", etc. are based on the orientations or positional relationships shown in the accompanying drawings, and are only for facilitating description and simplifying the description of the present disclosure, rather than indicating or implying that a device or element referred to must have a particular orientation or be constructed and operated in a particular orientation, and therefore, the above terms cannot be interpreted as limitations on the present disclosure.

It can be understood that the term "a" should be understood as "at least one" or "one or more", that is, in one embodiment, the number of an element may be one, and in another embodiment, the number of the element may be more than one, so the term "one" cannot be understood as a limitation on the number.

Embodiment 1: As shown in FIG. 1 to FIG. 6, a flowerpot structure includes a flowerpot body, where the flowerpot body includes an inner pot 1 and an outer pot 2 that are detachably matched, the inner pot 1 includes a pot opening 11 and a compressible pot body 12, an upper end of the outer pot 2 is detachably matched with the pot opening 11, the outer pot 2 is detachably mounted with a pot holder 3, and the outer pot 2 can be unfolded into a sheet-like structure. The pot opening 11 and the pot holder 3 are made of hard materials.

The pot opening 11 and the pot body 12 are fixed into a one-piece structure, and the pot body 12 is made of a flexible material. The pot opening 11 and the pot body 12 are fixed by hot pressing or bonding.

The outer pot 2 is of a cylindrical structure formed by connecting a head and a tail of a single material piece or a cylindrical structure formed by splicing a plurality of material pieces, the upper end and a lower end of the outer pot 2 are provided with buckle slots 2a respectively, the pot opening 11 and the pot holder 3 are provided with buckles 5 adapted to the buckle slots 2a respectively, and a side edge of the outer pot 2 is provided with connecting buckles 2b.

In this embodiment, the outer pot 2 is of a cylindrical structure formed by connecting heads and tails of two material pieces. After the two material pieces are connected by the connecting buckles 2b to form the cylindrical outer pot 2, the upper end of the outer pot 2 is fixed to the pot opening 11 of the inner pot 1 by the matching of the buckle slots 2a and the buckles 5, and the lower end of the outer pot 2 is fixed to the pot holder 3 by the matching of the buckle slots 2a and the buckles 5.

As an extension, positions of the buckles 5 and the buckle slots 2a can be exchanged to achieve fixed connection of the outer pot 2 with the pot opening 11 and the pot holder 3, too. That is, buckles 5 are arranged at the upper and lower ends of the outer pot 2 respectively, and the adapted buckle slots 2a are arranged on the pot opening 11 and the pot holder 3.

A bottom of the pot body 12 is provided with a drainage hole 12b, and a plug cover 12c is mounted on the drainage hole 12b. Water in the pot body 12 can be drained from the drainage hole 12b.

When packaging for transportation, the outer pot 2 is separated from the pot opening 11 and the pot holder 3, and the outer pot 2 is unfolded into a sheet-like structure. Because the pot body 12 made of a flexible material can be compressed and stored during transportation, the packaging volume can be greatly reduced, thereby reducing transportation costs. When the outer pot 2 is of a cylindrical structure formed by connecting a head and a tail of a single material piece, the outer pot 2 is preferably made of a flexible material to facilitate folding and storage during transportation.

Figure 7:
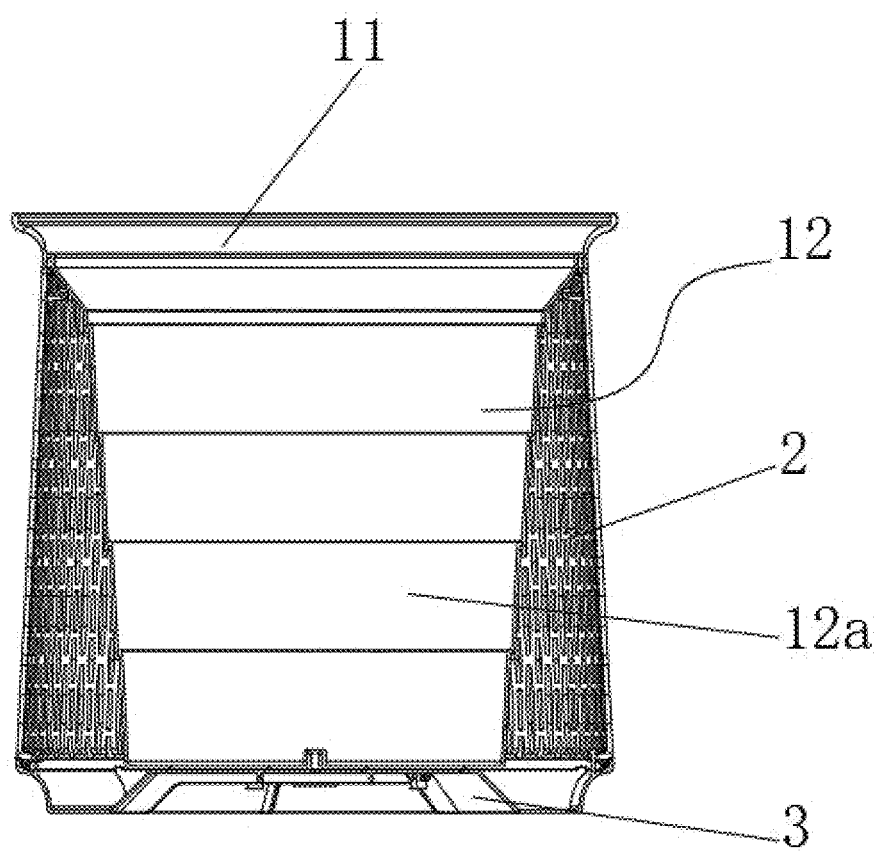
FIG. 7 is a cross-sectional view of Embodiment 2 of the present disclosure.
Figure 8:
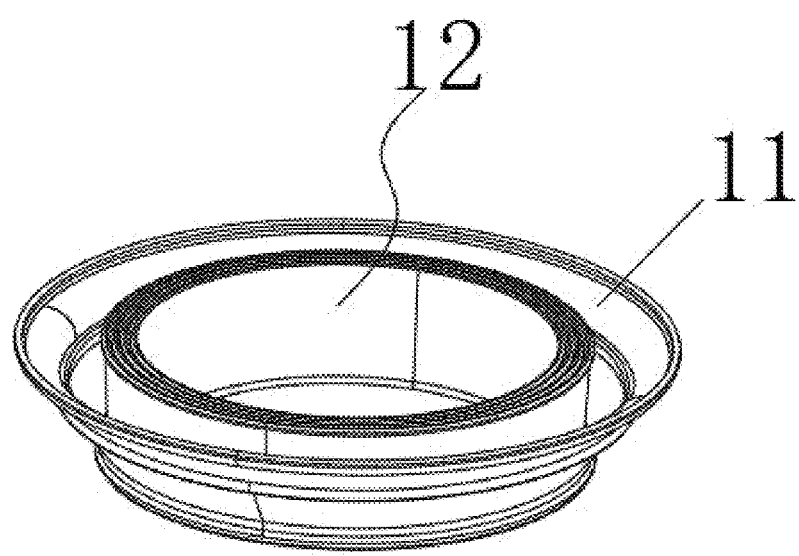
FIG. 8 is a view showing a compressed state of an inner pot in Embodiment 2 of the present disclosure.

Embodiment 2: As shown in FIG. 7 to FIG. 8, the flowerpot structure in this embodiment is similar to that in Embodiment 1, except that the pot opening 11 and the pot body 12 are fixed into a one-piece structure, and the pot body 12 is composed of a plurality of pot rings 12a that have gradually decreasing diameters and can be vertically and movably compressed. As shown in FIG. 8, after the inner pot 1 is compressed, the pot rings 12a are nested one by one to greatly reduce the height.

Figure 9:
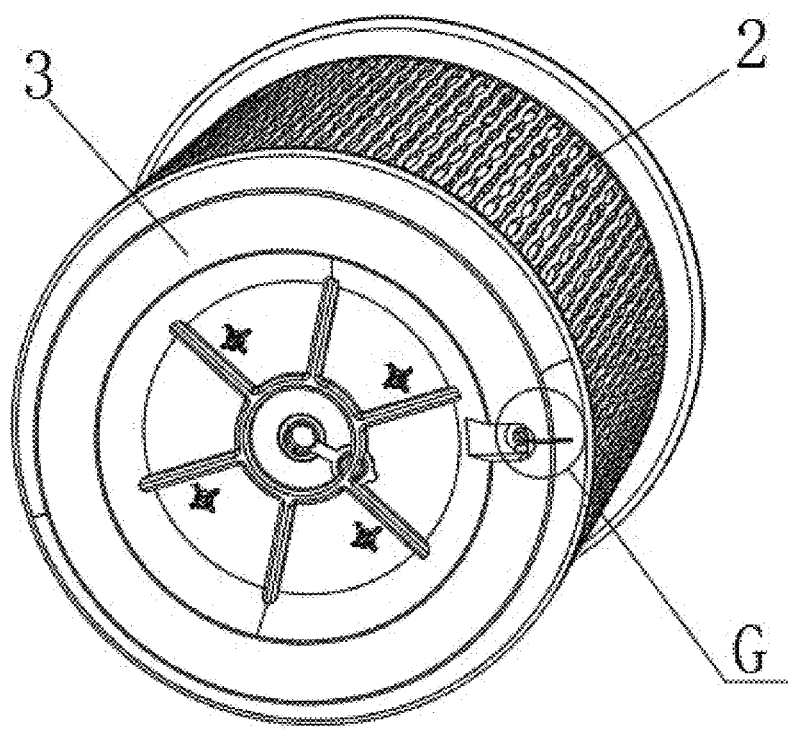
FIG. 9 is a perspective view of Embodiment 3 of the present disclosure.
Figure 10:
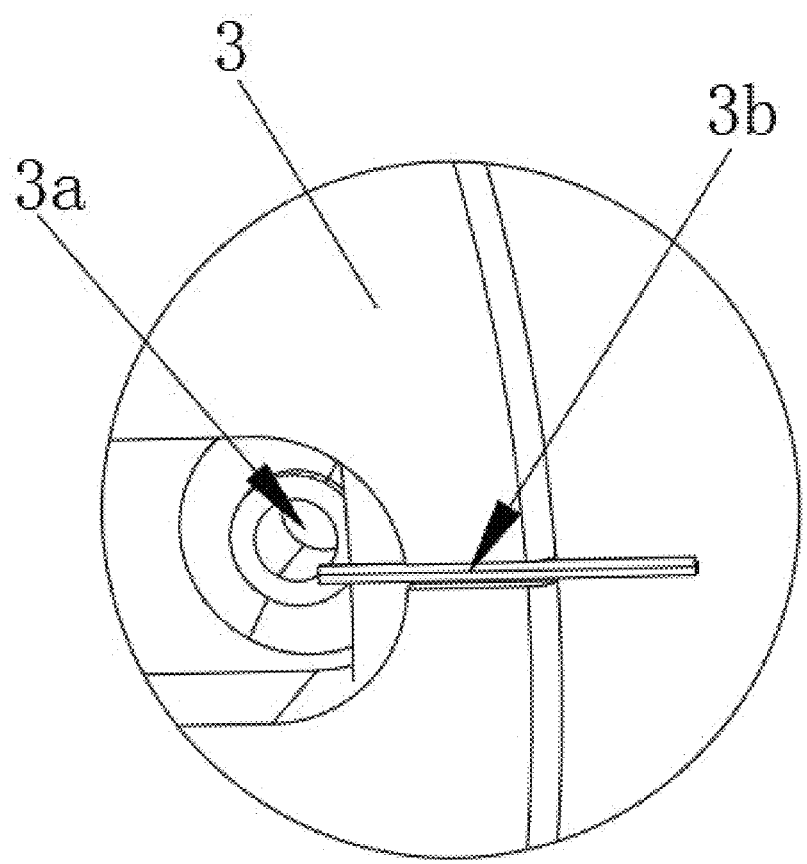
FIG. 10 is an enlarged view of part G in FIG. 9.
Figure 11:
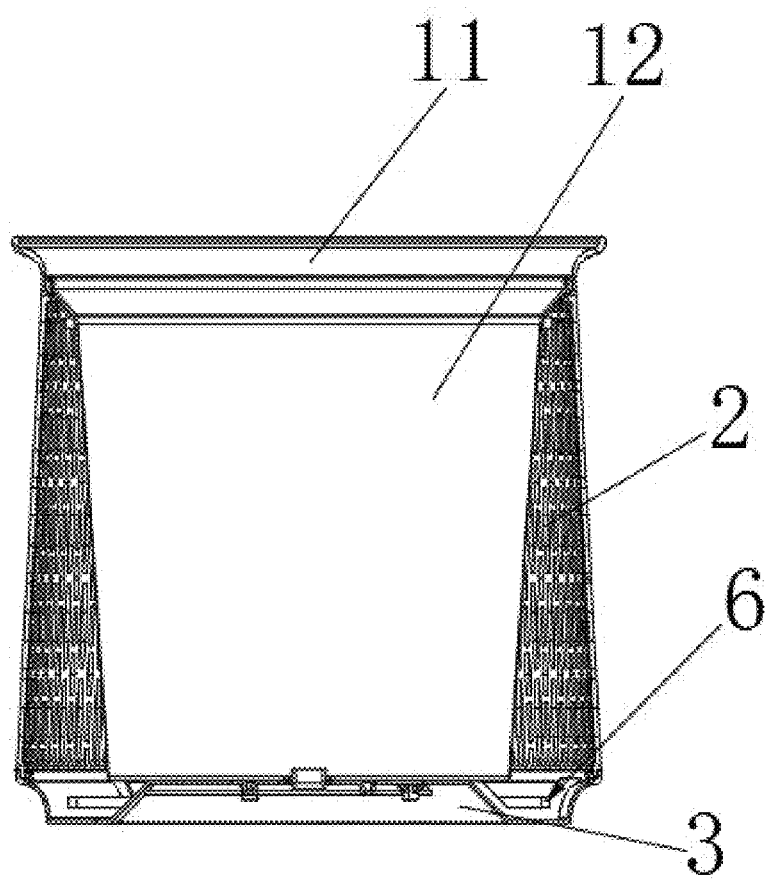
FIG. 11 is a cross-sectional view of Embodiment 3 of the present disclosure.

Embodiment 3: As shown in FIG. 9 to FIG. 11, the flowerpot structure of this embodiment is based on Embodiment 1, where the flowerpot body is provided with decorative lights 6, the outer pot 2 employs a hollow structure, and the pattern or shape of the hollow structure can be designed arbitrarily. Upper and lower parts of the flowerpot are provided with the decorative lights 6. After the decorative lights 6 are powered on, light is emitted from the hollow structure, which can improve the aesthetics of the flowerpot. The outer pot 2 may alternatively be made of a light transmitting material. In this embodiment, the decorative lights 6 are light strips. The decorative lights 6 may alternatively be light beads.

The decorative lights 6 are connected to an electric wire, the pot holder 3 is provided with a threading hole 3a, and an edge of the pot holder 3 is provided with a wiring duct 3b. The threading hole 3a and the wiring duct 3b facilitate the routing of the electric wire.

Decorative lights 6 can also be added to the flowerpot structures in Embodiments 2 to 5. In the above embodiments, the pot opening 11 is of a circular structure, and it may be of a square structure, an elliptical structure, etc.

Figure 12:
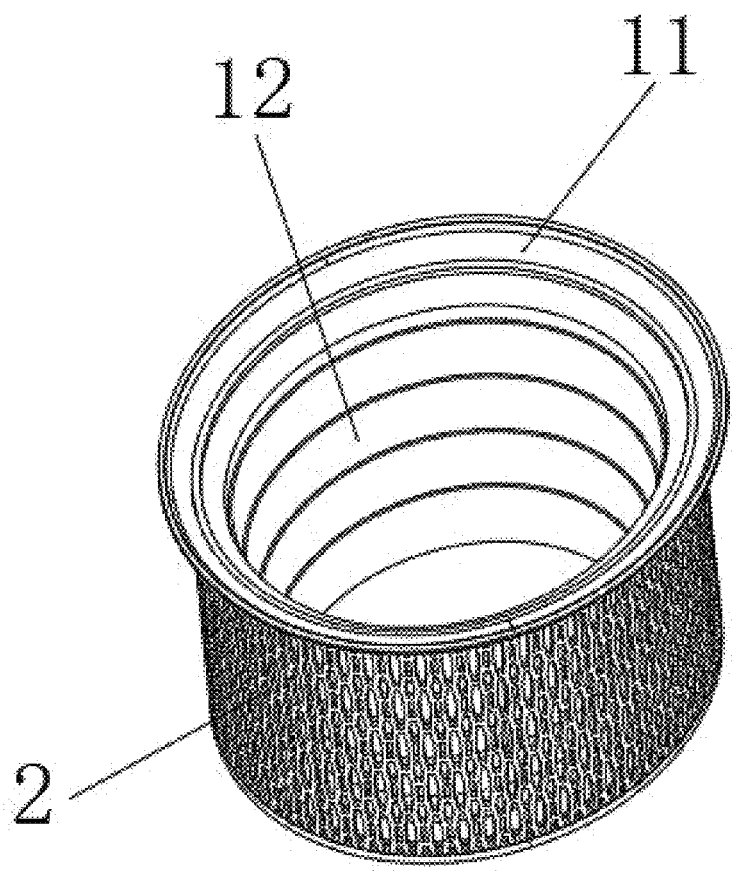
FIG. 12 is a perspective view of Embodiment 4 of the present disclosure.

Embodiment 4: As shown in FIG. 12, the flowerpot structure in this embodiment is similar to that in Embodiment 2, except that in this embodiment, the pot opening 11 is of an elliptical structure, and shapes of the pot body 12, the outer pot 2, and the pot holder 3 are adapted to the pot opening 11.

Figure 13:
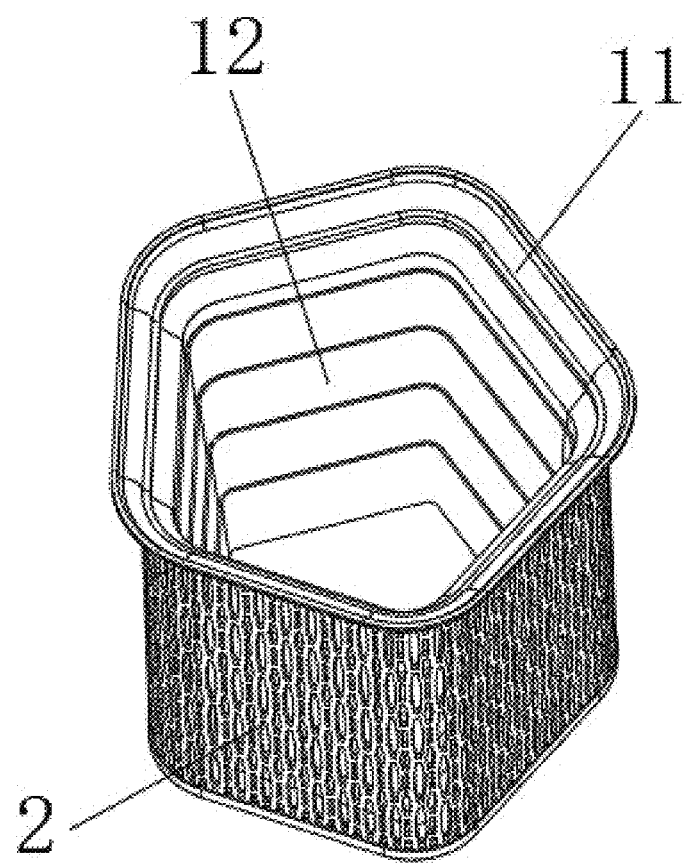
FIG. 13 is a perspective view of Embodiment 5 of the present disclosure.

Embodiment 5: As shown in FIG. 13, the flowerpot structure in this embodiment is similar to that in Embodiment 5, except that in this embodiment, the pot opening 11 is of a regular pentagonal structure, and shapes of the pot body 12, the outer pot 2, and the pot holder 3 are adapted to the pot opening 11.

Figure 14:
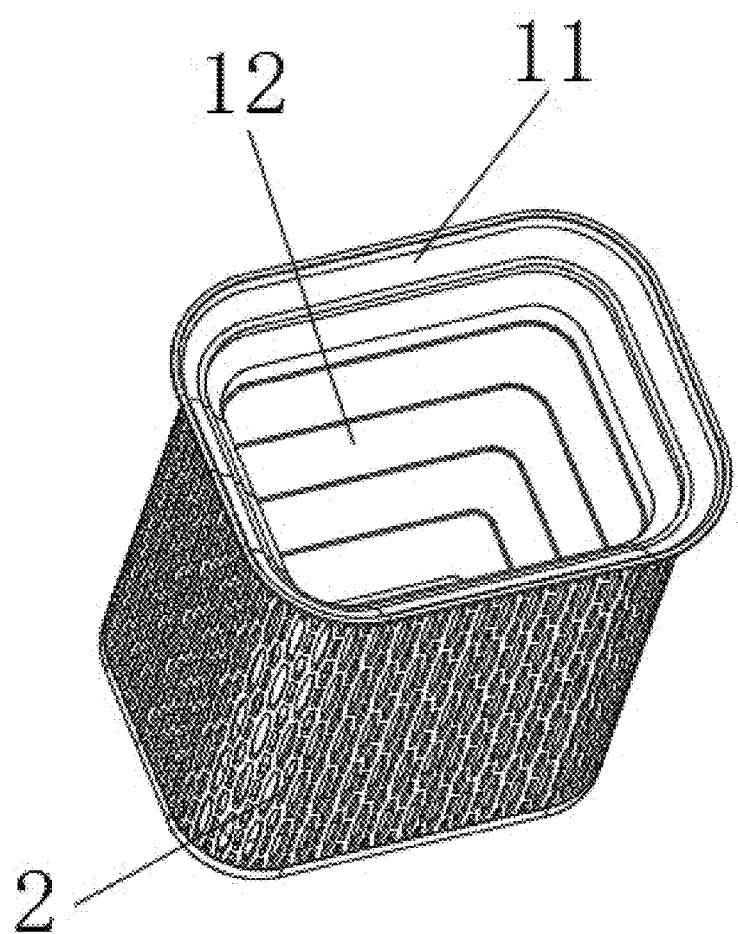
FIG. 14 is a perspective view of Embodiment 6 of the present disclosure.

Embodiment 6: As shown in FIG. 14, the flowerpot structure in this embodiment is similar to that in Embodiment 2, except that in this embodiment, the pot opening 11 is of a rectangular structure, and shapes of the pot body 12, the outer pot 2, and the pot holder 3 are adapted to the pot opening 11.

Figure 15:
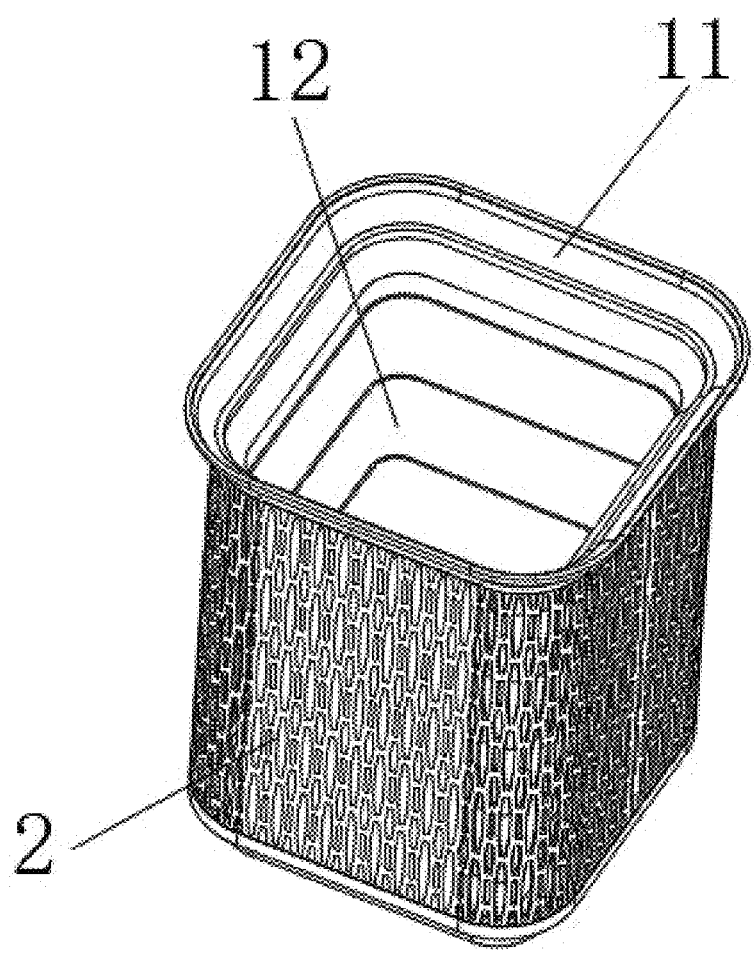
FIG. 15 is a perspective view of Embodiment 7 of the present disclosure.
Figure 16:
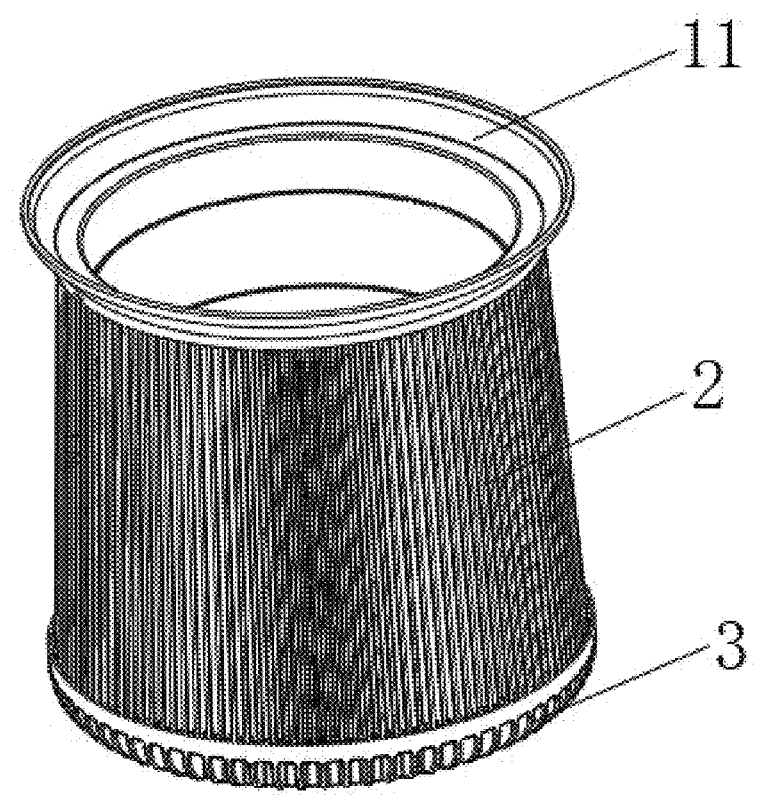
FIG. 16 is a perspective view of Embodiment 8 of the present disclosure.
Figure 17:
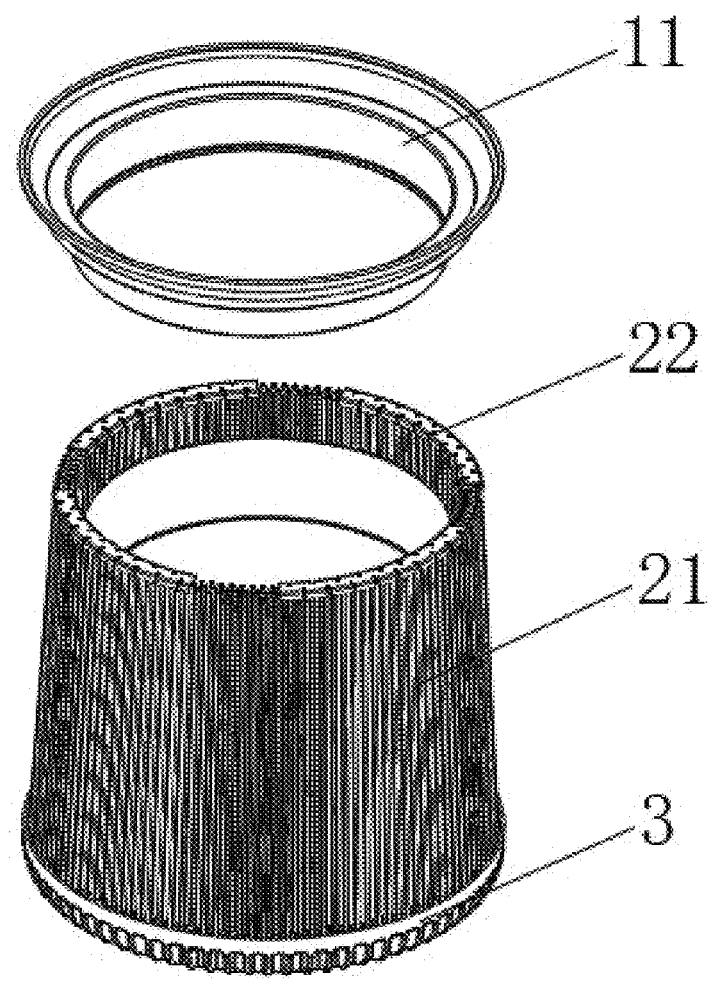
FIG. 17 is an exploded view of Embodiment 9 of the present disclosure.
Figure 18:
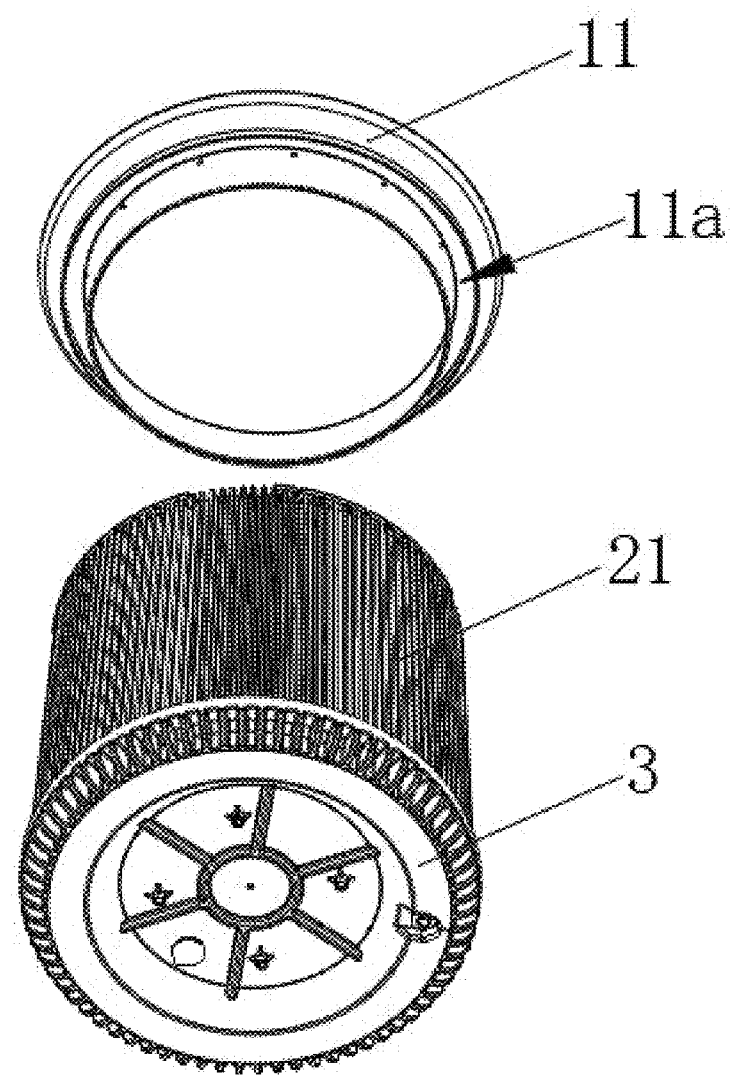
FIG. 18 is an exploded view of Embodiment 8 of the present disclosure from another perspective.
Figure 19:
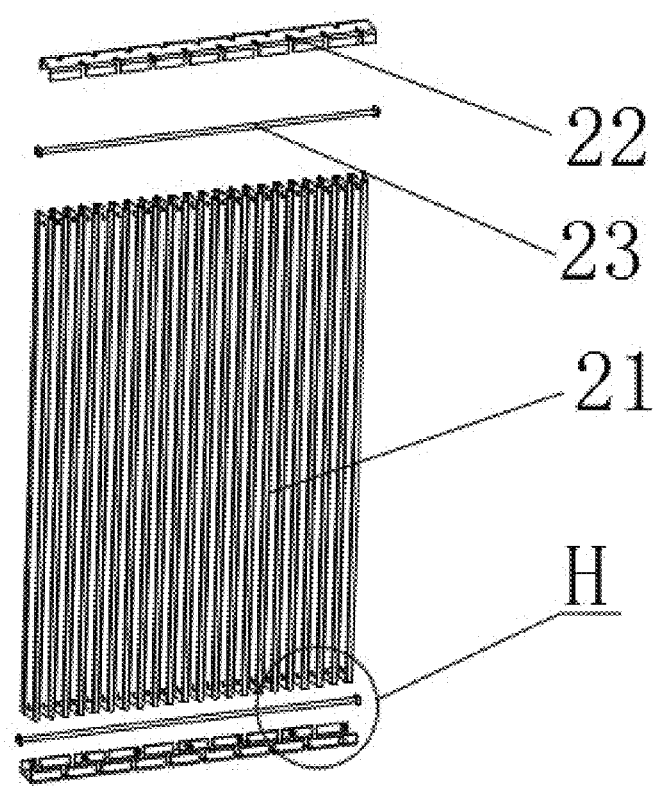
FIG. 19 is an exploded view of an outer pot in FIG. 16.
Figure 20:
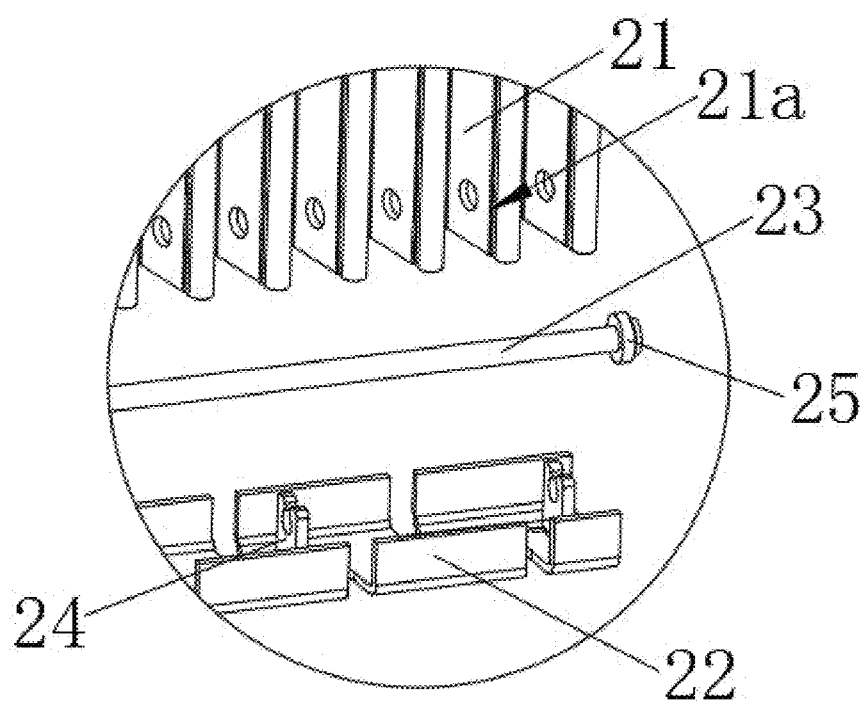
FIG. 20 is an enlarged view of part H in FIG. 19.
Figure 21:
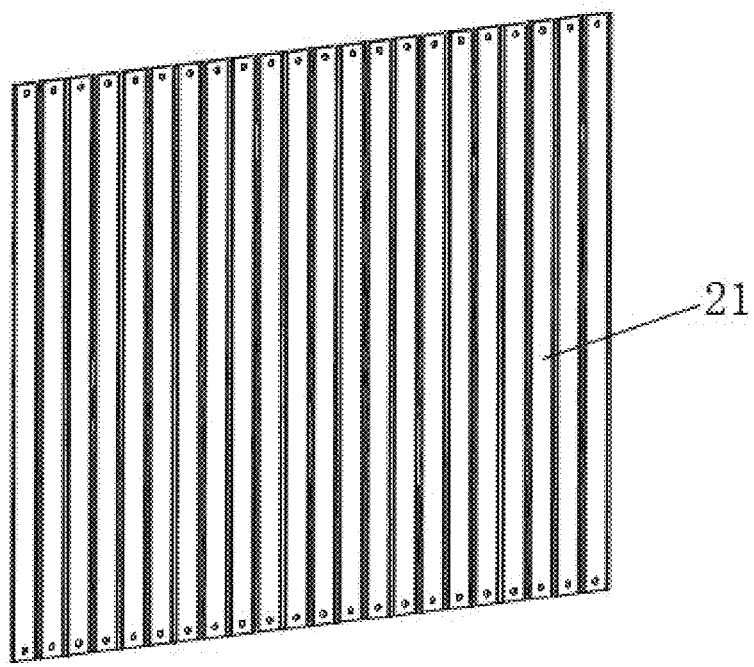
FIG. 21 is a view showing an unfolded state of a plate main body in FIG. 19.

Embodiment 7: As shown in FIG. 15, the flowerpot structure in this embodiment is similar to that in Embodiment 2, except that in this embodiment, the pot opening 11 is of a square structure, and shapes of the pot body 12, the outer pot 2, and the pot holder 3 are adapted to the pot opening 11.

Embodiment 8: As shown in FIG. 16 to FIG. 21, in this embodiment, the outer pot 2 includes a plate main body 21, the plate main body 21 is of a continuous bending structure, upper and lower ends of the plate main body 21 are provided with a shaping groove rail 22, a guide rod 23 is detachably matched in the shaping groove rail 22, and the guide rod 23 is inserted at an end of the plate main body 21.

The upper end of the outer pot 2 of the flowerpot is fixed to the pot opening 11, the lower end of the outer pot 2 is fixed to the pot holder 3, the segmented shaping groove rail 22 is arranged at the upper end of the plate main body 21, a recess 11*b* adapted to the shaping groove rail 22 is arranged in the pot opening 11, the shaping groove rail 22 is fixed in the recess 11*b*, and an assembly slot adapted to the shaping groove rail 22 is also arranged in the pot holder 3. The shaping groove rail 22 can be fixed with the recess 11*b* by fixing parts such as screws or buckles, or by bonding.

Buckles 24 adapted to the guide rod 23 are arranged in the shaping groove rail 22 at intervals. The plate main body 21 is of a flat plate structure after being manufactured, and bending grooves 21*a* on the plate main body 21 are integrally formed. During assembly, the guide rod 23 is threaded into a through hole at an end of the plate main body 21, the plate main body 21 is bent along the bending grooves 21*a* to form a continuous bending structure, and then the guide rod 23 is buckled into the buckles 24 of the shaping groove rail 22 to connect the plate main body 21, the guide rod 23, and the shaping groove rail 22 into a plate. Because the plate main body 21 is of continuous bending structure to form a continuous N-shaped structure, the plate main body 21 has some thickness and sufficient support force. After assembly, the through hole at the outermost end of the plate main body 21 is placed outside a limit ring 25 on the guide rod 23. Generally, the limit rings 25 are placed at two ends of the guide rod 23. The limit ring 25 is in damping fit with the guide rod 23 (the limit ring 25 may be made of a material having some elasticity, such as rubber), and the limit ring 25 can slide on the guide rod 23. Due to the limitation of the limit ring 25, the plate main body 21 is prevented from being folded inwards, so that the plate main body 21 can remain in a semi-unfolded state.

During transportation, the plate main body 21, the guide rod 23, and the shaping groove rail 22 are disassembled, and then the plate main body 21 is compressed, thereby reducing the packaging volume, which can greatly save transportation costs.

The flowerpot of the present disclosure achieves a reduction in transportation volume by using its detachable structure. No matter whether a single flowerpot is or a plurality of flowerpots are transported, the packaging volume during transportation can be reduced by disassembly and compression, thereby greatly reducing transportation costs.

The above are only the preferred embodiments of the present disclosure and are not intended to limit the implementation and protection scope of the present disclosure. Those skilled in the art should recognize that all solutions obtained by equivalent substitutions and obvious changes made using the description and illustrations of the present disclosure should fall within the protection scope of the present disclosure.

What is claimed is:

1. A flowerpot structure, comprising a flowerpot body, wherein the flowerpot body comprises an inner pot (1) and an outer pot (2) that are detachably matched, the inner pot (1) comprises a pot opening (11) and a compressible pot body (12), an upper end of the outer pot (2) is detachably matched with the pot opening (11), the outer pot (2) is detachably mounted with a pot holder (3);

wherein the outer pot (2) comprises a plate main body (21), the plate main body (21) is of a continuous bending structure, upper and lower ends of the plate main body (21) are provided with a shaping groove rail (22), a guide rod (23) is detachably matched in the shaping groove rail (22), and the guide rod (23) is inserted at an end of the plate main body (21).

2. The flowerpot structure according to claim 1, wherein the pot opening (11) and the pot body (12) are fixed into a one-piece structure, and the pot body (12) is made of a flexible material.

3. The flowerpot structure according to claim 1, wherein the pot opening (11) is detachably matched with the pot body (12), the pot opening (11) is fixed with the pot body (12) by a fixing ring (13), and the pot body (12) is made of a flexible material.

4. The flowerpot structure according to claim 1, wherein the pot opening (11) is detachably matched with the pot body (12), the pot body (12) is made of a flexible material, an upper end of the pot body (12) is provided with an upper connecting ring (41), a lower end of the pot body (12) is provided with a lower connecting ring (42), a plurality of vertical rods (43) are arranged between the upper connecting ring (41) and the lower connecting ring (42), upper ends of the vertical rods (43) are rotatably matched with the upper connecting ring (41), lower ends of the vertical rods (43) are rotatably matched with the lower connecting ring (42), middle parts of the vertical rods (43) are provided with an inner bending hinge (44), an inner circumference of the pot opening (11) is provided with an assembly slot (11*a*), and the upper connecting ring (41) is fixed in the assembly slot (11*a*).

5. The flowerpot structure according to claim 1, wherein the pot opening (11) and the pot body (12) are fixed into a one-piece structure, the pot body (12) is made of a flexible material, the pot body (12) is provided with spiral ribs (14), an upper end of the pot body (12) is fixed with a hard fixed flange (15), and the hard fixed flange (15) is fixed to the pot opening (11).

6. The flowerpot structure according to claim 1, wherein the pot opening (11) and the pot body (12) are fixed into a one-piece structure, and the pot body (12) is composed of a plurality of pot rings (12*a*) capable of being vertically and movably compressed.

7. The flowerpot structure according to claim 1, wherein the outer pot (2) is of a cylindrical structure formed by connecting a head and a tail of a single material piece or a cylindrical structure formed by splicing a plurality of material pieces, the upper end and a lower end of the outer pot (2) are provided with buckle slots (2*a*) respectively, the pot opening (11) and the pot holder (3) are provided with buckles (5) adapted to the buckle slots (2*a*) respectively, and a side edge of the outer pot (2) is provided with connecting buckles (2*b*).

8. The flowerpot structure according to claim 1, wherein the flowerpot body is provided with a decorative light strip (6), and the outer pot (2) employs a hollow structure or is made of a light transmitting material.

9. The flowerpot structure according to claim 8, wherein the decorative light strip (6) is connected to an electric wire, the pot holder (3) is provided with a threading hole (3a), and an edge of the pot holder (3) is provided with a wiring duct (3b).

* * * * *